Sept. 17, 1957   L. A. COOK ET AL   2,806,718
UNPLASTICIZED RESIN PROTECTIVE LINING FOR HEAT EXCHANGER TUBE
Filed Oct. 27, 1954
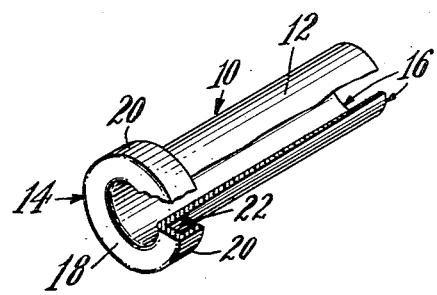
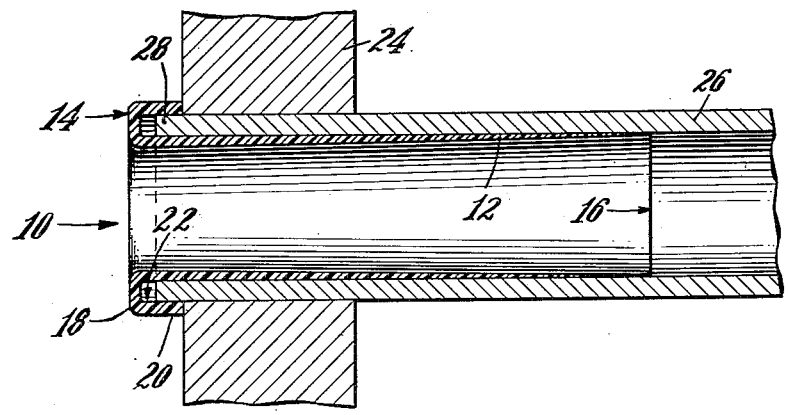
INVENTORS
LEON A. COOK
CHARLES F. HUTCHEON
BY Robert Huber
ATTORNEY

United States Patent Office 2,806,718
Patented Sept. 17, 1957

2,806,718

UNPLASTICIZED RESIN PROTECTIVE LINING FOR HEAT EXCHANGER TUBE

Leon A. Cook, Westfield, N. J., and Charles F. Hutcheon, Little Neck, N. Y., assignors to World Plastex, Bronx, N. Y., a partnership Application October 27, 1954, Serial No. 464,956

1 Claim. (Cl. 285—55)

The present invention relates to a lining for the walls of a heat exchanger tube adjacent its ends. More specifically, the present invention relates to an unplasticized synthetic resin protective lining for the interior walls of a heat exchanger tube continguous its inlet and outlet ends.

It is well known in the art that considerable difficulty has been experienced with deterioration of the inner wall of metallic heat exchanger tubes due to corrosion and erosion thereof by the fluids passing therethrough. Among the factors contributing to this deterioration is the corrosiveness of the transmitted liquid on the metal, the presence of dissolved gases, e. g., air, in the liquid running through the tube, and turbulence in the liquid as it changes direction upon entering and leaving the heat exchanger tube.

In an attempt to obviate these difficulties and preserve the interior walls of the heat exchanger tube, the use of protective liners composed of such things as Celluloid, rubber, Bakelite and certain thermoplastic resins has been suggested. However, these materials have not been found to be completely satisfactory. For example, thermosetting materials such as Bakelite are too rigid and brittle and often fracture when being inserted into the tube. Hard rubber also suffers from this deficiency; whereas, great difficulty is experienced in inserting non-rigid soft rubber liners to give a completely smooth, interior surface free of turbulence-causing creases and ridges. Further, rubber materials are relatively non-resistant to oils and hydrocarbon solvents. Prior to the present invention thermoplastic materials, as a general rule, did not provide sufficient chemical and heat resistance for wide use in various types of heat exchangers. This latter fact made it necessary that a specific material be used with a specific fluid whereby many different types of liners had to be kept on hand and special care had to be exercised to insure the right liner for a specific liquid being used.

Another great disadvantage of prior thermoplastic lining materials is the necessity to incorporate a plasticizer into the resin composition to yield the desired properties for fabrication. It is will known that the degree of heat and chemical resistance decreases as the amount of plasticizer is increased. Also, in many instances, the plasticizer under varying thermal and chemical conditions tends to migrate toward the surface of the resinous article. Under such conditions, this plasticizer is very often transferred to the liquid passing through the heat exchanger tubes. Such contamination of the transferred liquid is obviously undesirable; for example, when foods in a fluid or semifluid form are being passed through the heat exchanger or when chemical liquids that must retain a high degree of purity are being operated upon. Also, the removal or leaching-out of the plasticizer from the article causes the latter to become brittle and to lose its desirable properties whereby it may fracture or otherwise fail. At best the deplasticized article is non-reusable once it has been removed from the tube.

It is, therefore, an object of the present invention to provide a synthetic resin liner for the walls of a heat exchanger tube contiguous its inlet and outlet ends.

It is a further object of the instant invention to provide a synthetic resin liner for the walls of a heat exchanger tube contiguous its inlet and outlet ends which is substantially universally resistant to chemical attack.

Another object of the present invention is to provide a synthetic resin liner for the walls of a heat exchanger tube contiguous its inlet and outlet ends which provides protection for the metal walls of the tube over a wide range of temperatures.

Still another object of the present invention is to provide a synthetic resin protective liner which is free from plasticizer.

Still another object of the present invention is to provide a synthetic resin protective liner for the walls of a heat exchanger tube contiguous its inlet and outlet ends which is easily inserted into the tube, conforms readily to the interior configuration of said tube and may be easily removed.

A further object of the present invention is to provide an unplasticized synthetic resin liner for the walls of a heat exchanger tube contiguous its inlet and outlet ends which does not deteriorate after long periods of continued use and which continues to protect the walls after being removed and reinserted many times.

Numerous other objects and advantages of the invention will be apparent as it is better understood from the following description which, taken in connection with the accompanying drawings, discloses a preferred embodiment thereof.

We have discovered that the above and other objects of the invention may be achieved by forming a protective liner for the interior walls of a heat exchanger tube contiguous its inlet and outlet ends from a linear polyamide resin, such as "Nylon." We have also discovered that by forming this liner in a particular manner more fully described hereinafter, the turbulence of the liquid flowing into the heat exchanger tube, the liberation of gases dissolved in this liquid and the formation of bubbles in the liquid is markedly reduced.

Referring to the drawings:

Figure 1 is a perspective view of the novel tube liner with part thereof broken away; and Figure 2 is an elevation view in section of the novel protective liner inserted in the end of a heat exchanger tube mounted in a tube sheet.

The preferred and exemplary embodiment of the present invention comprises a synthetic resin liner generally designated 10 having a tubular body portion 12 and a head portion 14. The body portion 12 has an interior taper terminating in a feather edge 16 at its inner end remote from the head portion 14. This interior taper is necessary to minimize turbulence in a liquid as it passes from the lining element 10 into the unlined portion of the heat exchanger tube.

The head portion 14 of liner 10 has a laterally directed flange 18 terminating in a skirt portion 20 extending inwardly toward the feathered edge 16 thereby forming an annular space or groove 22 between the outer circumference of body portion 12 and skirt 20.

In the assembly of liner 10 in a heat exchanger unit composed of a tube sheet 24 and a heat exchanger tube 26 mounted in tube sheet 24, the body portion 12 of liner 10 is inserted in the opening of tube 26 and forced inwardly into the tube as by a hammer blow until the terminal edge of skirt 20 abuts the tube sheet 24 (Figure 2). It is the usual practice to have the inlet opening of tube 26 extend a slight distance outwardly from tube sheet 24 as shown at 28. In driving the liner 10 into tube 26 to its fullest extent, the extending portion 28 of tube 26 protrudes into the annular space 22 but does not abut the inner wall of flange 14. In this way, expansion of tube 26 outwardly from the tube sheet 24 is easily accommodated without forcing the skirt portion 20 out of engagement with the tube sheet 24.

It has been found that the tight engagement of skirt portion 20 against the outer face of tube sheet 24 greatly reduces turbulence in the liquid flowing into the heat exchanger tube by presenting to the flow of liquid a smooth surface free of abrupt changes, pockets or baffle-like projections. Also, this construction helps reduce the formation of gas bubbles in the liquid, which gas bubbles are largely responsible for the corrosion and erosion of the heat exchanger tube.

The material from which the synthetic resin liner of the present invention is made is "Nylon," i. e. a linear polyamide resin, and preferably a particular type of "Nylon." The "Nylons" useful in the instant invention are those having a melting point of about from 300° F. to 700° F. and preferably about 500° F. The preferred material has a heat distortion temperature in excess of 480° F. and a Rockwell hardness of about from R–115 to R–120, e. g. R–118.

It has been found that the liner of the present invention is insoluble in common organic solvents, inert to alkalies and completely unaffected by petroleum oils and greases and photographic solutions. Under most conditions the liner was found to tolerate and be relatively unaffected by dilute mineral acids and most organic acids such as food acids and the like.

The abrasion resistance of this protective liner was found to be excellent compared to other unfilled plastics. It has also considerably better heat resistance than any other thermoplastic material and can withstand continued exposure to temperatures tolerated by many thermosetting resins. Because of its high modulus of elasticity, about 400,000 p. s. i. at 77° F., the liner is readily deformable without danger of fracture to fit into and be removable from tubes having an inside diameter less than the outside dimension of the liner. Further, the liner of the instant invention is fabricated from and remains a completely homogeneous material needing no plasticizer or other additive to achieve its outstanding properties.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

In combination, a tube sheet, a heat exchanger tube mounted in said tube sheet with the terminal end thereof extending from one face of said tube sheet, a protective liner for said heat exchanger tube having a body member extending into and in firm frictional engagement with the inner wall of said tube and a flanged head member integral with said body member and disposed adjacent said terminal end of said tube, the outer portion of said flange having a laterally extending skirt defining an annular groove between the outer circumference of said body member and the inner circumference of said skirt, said extending terminal end disposed in said groove, the depth of said groove being greater than the extension of said terminal end from said tube sheet with said end spaced from the base of said groove, the surface of said skirt remote from said flange abutting said tube sheet face whereby said terminal end of said tube is completely enclosed in said groove, said body and head members composed of an unplasticized linear polyamide resin having a flow temperature of about 500° F., a Rockwell hardness of about from R–115 to R–120 and a modulus of elasticity of about 400,000 p. s. i. at 77° F.

References Cited in the file of this patent

UNITED STATES PATENTS

| | | |
|---|---|---|
| 2,225,615 | Bay | Dec. 24, 1940 |
| 2,265,119 | Coolidge | Dec. 2, 1941 |
| 2,310,927 | Bay | Feb. 16, 1943 |
| 2,735,699 | Chadbourne | Feb. 21, 1956 |